Jan. 13, 1925.

P. JARAY 1,522,956

ALIGHTING GEAR FOR LIGHTER THAN AIR AIRCRAFT

Filed Sept. 3, 1921

Inventor:
Paul Jaray
by
Attorney.

Patented Jan. 13, 1925.

1,522,956

UNITED STATES PATENT OFFICE.

PAUL JARAY, OF FRIEDRICHSHAFEN ON THE BODENSEE, GERMANY, ASSIGNOR TO THE FIRM LUFTSCHIFFBAU ZEPPELIN G. M. B. H., OF FRIEDRICHSHAFEN A. B., GERMANY.

ALIGHTING GEAR FOR LIGHTER-THAN-AIR AIRCRAFT.

Application filed September 3, 1921. Serial No. 498,360.

*To all whom it may concern:*

Be it known that I, PAUL JARAY, a citizen of the Austrian Republic, residing at Friedrichshafen on the Bodensee, Germany, have invented certain new and useful Improvements in Alighting Gear for Lighter-Than-Air Aircraft (for which I have filed application in Germany, April 23, 1920; England, April 25, 1921; Italy, March 29, 1921; Spain, March 31, 1921), of which the following is a specification.

Buffers have been used to ensure the aircraft being more or less in a condition of static equilibrium when it came in contact with the earth, the aircraft being assisted by men on landing or while being conducted into the shed. This procedure is not only very expensive but presents numerous inconveniences.

This invention does away with these inconveniences by using the well known alighting gears and inserting the lower part thereof in frames which are elastically stayed and which are preferably removably and elastically connected with the body of the gondola said frames having wheels adapted to adjust themselves automatically according to the actual direction of flight.

Such a gear is preferably employed for gliding starts that is to say for such cases in which the aircraft does not possess any lifting power but on the contrary possesses a moderate dead weight. The alighting gear according to this invention owing to its natural elasticity permits of an easy start and easy lifting from the ground at the moment when the ascent begins. It can also however be used with advantage at the start in static equilibrium. In the latter case the alighting gear itself can be made somewhat heavier or it can be provided with removable weights so that it may be adapted to balance the lifting power. The alighting gear offers the same advantages on landing. The shock from landing can be absorbed in the simplest manner by the network between the frames. The effect can be increased by a convenient construction of the usual buffers on the underside of the cars.

The attachment of the alighting gear to the gondola is especially important. According to this invention it is effected by means of members which are preferably elastic and adapted to be quickly detached without any difficulty. According to this invention one complete alighting gear is provided for every car but it is evident that a common alighting gear could be used for several gondolas if said gondolas were suitably arranged with regard to the body of the aircraft.

In order that the invention may be clearly understood it will now be described with reference to the form of construction shown by way of example in the accompanying drawing, wherein.

Figure 1:
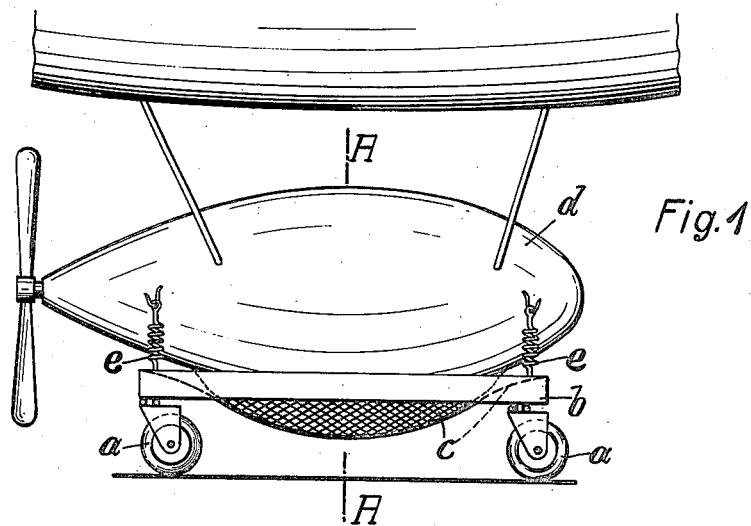
Fig. 1 shows in side elevation the gondola of an aircraft mounted on a complete alighting gear according to this invention.
Figure 2:
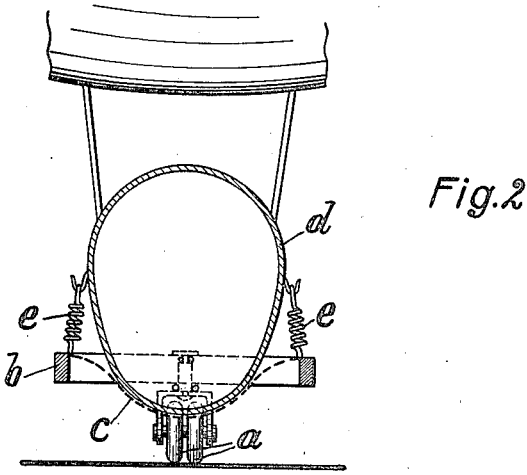
Fig. 2 is a section on line A—A of Fig. 1.

The alighting gear consists of two pairs of pivoted wheels *a* fixed to a frame *b*. The frame *b* carries an elastic net work *c* designed to receive the car *d*. An elastic connection between the gondola *d* and the frame *b* for bringing the airship into the shed consists of springs *e* which can be rapidly connected or disconnected by means of toggle levers or in any other convenient manner.

I wish it to be understood that I do not desire to be limited to the exact details of construction shown and described, for obvious modifications will occur to a person skilled in the art.

I claim:

1. Alighting gear for airships comprising a frame on wheels, elastic net-like shock absorbing means extending across said frame and means for removably attaching said frame to an airship car or gondola.

2. Alighting gear for airships comprising a frame, wheels adjustably pivoted to said frame, elastic net-like shock absorbing means extending across said frame and elastic means for removably attaching said frame to an airship car or gondola.

In testimony whereof I affix my signature in presence of two witnesses.

PAUL JARAY.

Witnesses:
 HANS BAMMEISTER,
 WILHELM BERG.